United States Patent
Heathe

(10) Patent No.: US 6,227,692 B1
(45) Date of Patent: *May 8, 2001

(54) DOUBLE WAVE SCREW

(75) Inventor: William R. Heathe, Mississauga (CA)

(73) Assignee: Husky Injection Molding Systems Ltd. (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/909,716

(22) Filed: Aug. 12, 1997

(Under 37 CFR 1.47)

(51) Int. Cl.[7] .......................... B29C 45/48; B29C 47/38
(52) U.S. Cl. ............................ 366/81; 366/88; 366/89; 366/90; 425/204; 425/208
(58) Field of Search ..................... 425/204, 208; 366/88, 89, 81, 90

(56) References Cited

U.S. PATENT DOCUMENTS

| | | |
|---|---|---|
| 2,753,595 | 7/1956 | Dulmage . |
| 3,006,029 | 10/1961 | Saxton . |
| 3,184,790 | 5/1965 | Araki . |
| 3,584,340 * | 6/1971 | Koch . |
| 3,687,423 | 8/1972 | Koch et al. . |
| 3,701,512 | 10/1972 | Schippers et al. . |
| 3,788,612 * | 1/1974 | Dray ........................................ 366/81 |
| 3,788,614 * | 1/1974 | Gregory ................................. 425/209 |
| 3,858,856 | 1/1975 | Hsu . |
| 3,870,284 | 3/1975 | Kruder . |
| 3,941,535 | 3/1976 | Street . |
| 4,000,884 | 1/1977 | Chung . |
| 4,053,143 * | 10/1977 | Hosokawa et al. . |
| 4,079,463 | 3/1978 | Miller . |
| 4,107,788 | 8/1978 | Anders . |
| 4,128,341 | 12/1978 | Hsu . |
| 4,135,870 * | 1/1979 | Wallace et al. . |
| 4,140,400 | 2/1979 | Lovegrove . |
| 4,173,417 | 11/1979 | Kruder . |
| 4,215,978 | 8/1980 | Takayama et al. . |
| 4,405,239 | 9/1983 | Chung et al. . |
| 4,511,319 * | 4/1985 | Takayama . |
| 4,639,143 | 1/1987 | Frankland, Jr. . |
| 4,708,623 | 11/1987 | Aoki et al. . |
| 4,729,666 * | 3/1988 | Takubo . |
| 4,840,492 * | 6/1989 | Nakamura ............................... 366/81 |
| 4,925,313 | 5/1990 | Nunn . |
| 4,944,906 * | 7/1990 | Colby et al. .......................... 425/208 |
| 5,035,509 * | 7/1991 | Kruder .................................. 425/208 |
| 5,698,235 * | 12/1997 | Satoh et al. ........................... 425/208 |
| 5,735,599 * | 4/1998 | Ishibashi et al. . |

* cited by examiner

Primary Examiner—Harold Pyon
Assistant Examiner—Joseph Leyson
(74) Attorney, Agent, or Firm—Bachman & LaPointe, P.C.

(57) ABSTRACT

A plasticating screw having improved mixing capability for polymer blends comprises a feed zone having a helical flight defining a solid material feed path, a compression zone for converting the solid material into molten material having a helical channel of variable depth, a waved melting zone for breaking up solid agglomerations and distributing them equally in the liquid melt, a spiral mixing zone that traps large agglomerations and contaminants, and a second melting zone for completing melting the material and for creating a substantially homogeneous melt. A method for mixing plastic material that has been at least partially plasticized and contains inhomogeneities is also described.

6 Claims, 3 Drawing Sheets

DOUBLE WAVE SCREW

BACKGROUND OF THE INVENTION

The present invention relates to a screw for plasticating plastic material and a method for mixing plastic material that has been at least partially plasticized and contains inhomogeneities.

Extrusion and injection molding processes form shapes from thermoplastic resin by softening or plasticating solid material to a molten state, shaping the product in an extrusion die or in a closed mold, and solidifying the shaped product by cooling. The properties of the final product depend to a major extent on the processing history of the material, and particularly on the thermal and physical homogeneity of the molten material prior to forming it, as well as the length of time the material is heated. For example, acid aldehyde formation in polyethylene teraphthalate (PET) type resins is directly related to the temperature, shear history and total cycle time. Accordingly, processing of a homogeneous melt at the lowest possible temperature, with minimized shear and time is a major concern in the injection molding and extrusion industries.

Over the years, a great deal of effort has been spent on designing the screws used to plasticate the material to be molded. As a result, the prior art is replete with a wide variety of differently configured plasticating screws. U.S. Pat. Nos. 2,753,595 to Dulmage and 3,006,029 to Saxton describe plasticating screws that employ distributive mixing elements to break down agglomerations or inhomogeneities in the melt. U.S. Pat. Nos. 3,687,423 to Koch et al.; 3,701,512 to Schippers et al.; 3,858,856 to Hsu; 3,870,284 to Kruder; 3,941,535 to Street; 4,000,884 to Chung; 4,079,463 to Miller; 4,128,341 to Hsu; 4,215,978 to Takayama et al.; 4,639,143 to Frankland, Jr.; and 4,925,313 to Nunn illustrate some other types of plasticating screws that employ dispersive mixing. Still another type of plasticating screw is shown in abandoned U.S. patent application Ser. No. 757,042, filed Jan. 5, 1977. There is disclosed in this abandoned application a screw provided with a helical flight and a valley wherein the bottom surface of the valley is divided into a plurality of parallel strip shaped portions having wavy contours with a predetermined phase difference therebetween which form a plurality of cross points between the wavy contours along the dividing plane.

New developments in plastic resin compositions now allow for PET type products to be used under relatively high temperatures, in so called "hot-fill" applications. In order to maintain physical properties at these higher temperatures, a polymer blend of PET and polyethylene napthalate (PEN) is normally used. However, PEN and PET are immiscible, so distributive mixing is required. Conventional PET screws cannot successfully process these new copolymer blends.

SUMMARY OF THE INVENTION

Accordingly, it is an object of the present invention to provide a screw for plasticating plastic material which ensures homogeneous mixing and melting without increasing overall shear.

It is a further object of the present invention to provide a screw as above which can successfully process both PET and PET blends.

It is yet a further object of the present invention to provide a screw as above which can successfully process non-PET resins and blends.

It is yet a further object of the present invention to provide a screw as above which can be used in extruders and injection molding machines.

It is yet another object of the present invention to provide a screw as above in which shear heat is minimized during resin melting, in order to minimize acid aldehyde.

It is still another object of the present invention to provide a method for mixing plastic material that has been at least partially plasticized and contains inhomogeneities.

The foregoing objects are attained by the screw and the method of the present invention.

In accordance with the present invention, a screw for plasticating plastic material broadly comprises: first means for receiving feedstock, usually in pellet form, and for compacting the feedstock into a solid material; second means for compressing the solid material and for forcing the compressed solid material against a heated wall to initiate melting of the plastic pellets; third means for breaking up the compressed solid material and for creating a melt with the solid particles being substantially equally distributed in said melt; fourth means for trapping solid particles having a size greater than a particular size and for allowing solid particles having a size less than the particular size to pass; and fifth means for completely melting the solid particles and for creating a substantially homogeneous melt. In a preferred embodiment of the present invention, the third means comprises a first melting zone having two helical channels. Each channel preferably has a plurality of peaks and valleys and with the peaks and valleys in the different channels being offset from each other so as to break up solid agglomerations and distribute them equally in the liquid melt. The fourth means preferably comprises a spiral mixer section having a plurality of helical channels. The fifth means preferably comprises a second mixing and melting zone having two helical channels. Each channel preferably has a plurality of peaks and valleys, with the peaks and valleys being offset from each other so as to completely melt the plastic material and generate a substantially homogeneous melt at the discharge end of the screw.

The method of the present invention broadly comprises the steps of: providing plastic feedstock to a rotatable screw; rotating the screw at a desired rate of rotation; melting a portion of the plastic feedstock in a first portion of the screw while the screw is rotating; trapping solid particles above a certain dimension in the molten plastic material in a mixer section of the screw adjacent the first portion while allowing molten plastic material with solid particles having a dimension less than the certain dimension to pass through the mixer section; and further melting the molten plastic material with the solid particles therein in a second portion of the screw adjacent the mixer section.

Other details of the screw and the method of the present invention, as well as other objects and advantages attendant thereto, are set forth in the following detailed description and the accompanying drawings in which like reference numerals depict like elements.

DETAILED DESCRIPTION OF THE PREFERRED EMBODIMENT(S)

Figure 1:
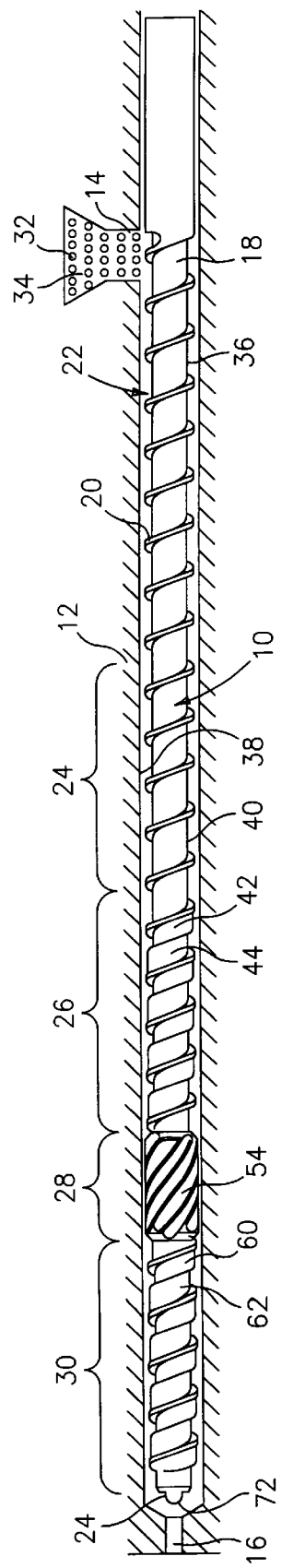
FIG. 1 is an elevation view illustrating the plasticating screw of the present invention.

Referring now to the drawings, FIG. 1 illustrates the plasticating screw 10 of the present invention. The screw 10 is contained in a heated barrel 12. The barrel 12 has an inlet port 14 and an outlet port 16 through which a molten material such as molten resin is discharged into a mold or the like.

The screw 10 includes a core shaft 18 which is rotatably driven at a desired rotational speed by conventional means (not shown) at the inlet end of the barrel 12. The core shaft may have any desired diameter. The screw 10 carries a primary conveying screw or thread flight 20 from the very beginning of the feed section 22 to the mixer section 28.

The screw 10 of the present invention can be broken into five sections. These include feed section 22, compression section 24, the first waved melting zone 26, the mixer section 28, and the second waved mixing and melting zone 30. The feed section or zone 22 starts right under the feed hopper 32 which contains feedstock 34 such as a plastic material, typically in pellet form. The feed zone 22 accepts the feedstock and compacts it into a solid as the screw 10 is rotated. Melting may also begin in this section. The compacted solid material and any liquid melt are conveyed by flight 20 to the next section. As can be seen from FIG. 1, the feed zone 22 is formed by a single helical channel 36 of uniform depth which defines a solid material feed path.

The compression section or zone 24 further compresses the solid material and squeezes it against a wall 38 of the heated barrel as the screw 10 is rotated. As can be seen from FIG. 1, this section is formed by a helical channel 40 of variable depth. As shown in FIG. 1, the channel 40 has a depth at its inlet greater than the depth at its outlet. Preferably, the depth of the channel 40 varies linearly from its inlet to its outlet.

Figure 2:
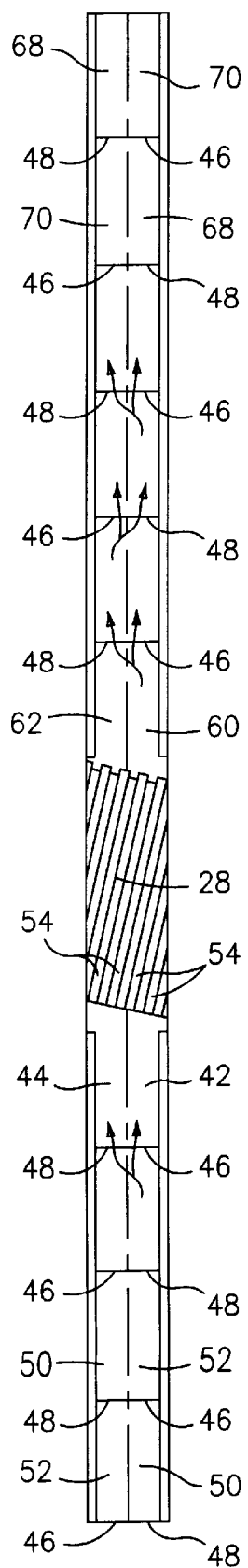
FIG. 2 is a perspective view of the wave and mixing sections of the screw of FIG. 1 which has been unwrapped from the screw root and straightened out, illustrating the flow of material.

After some melting of the plastic material has occurred in the compression zone 24 and as the screw continues to rotate, the material being processed enters the waved melting zone 26. As can be seen from FIGS. 1 and 2, the waved melting zone 26 consists of two parallel profiled channels 42 and 44. Each channel 42, 44 has a plurality of peaks 46, a plurality of valleys 48, and the same width. As can be seen from FIG. 2, the peaks 46 and valleys 48 in channel 42 are offset from the peaks 46 and valleys 48 in channel 44. Preferably, the peaks 46 in each channel are aligned with the valleys 48 in the other channel so as to enhance the mixing effect. The peaks 46 and valleys 48 in each channel are formed by alternating ascending portions 50 and descending portions 52 of the channel.

When the plastic material enters the waved melting zone 26, a portion of it is in a molten state. A significant portion of the material is, however, a compacted solid bed. As the material moves through the melting zone 26 as the screw 10 rotates, the solid bed is broken up and more of the material is melted. Some of the solid material in each channel flows over the peaks into the valleys in the adjacent channel as the plastic material moves along the melting zone 26. In this way, the solid particles are distributed substantially equally in the existing melt. Melting of the plastic material continues through heat conduction from the hot melt which is desirable from the standpoint of reducing the amount of shear needed for melting.

After leaving the melting zone 26 and as rotation of the screw continues, the material being processed flows into the spiral mixer section 28. As can be seen from FIGS. 1 and 2, the mixer section 28 is formed by a plurality of helical channels 54 of uniform width. Each channel 54 has a depth which gradually decreases from the channel inlet to the channel outlet. The mixer section 28 is designed to trap solid particles that are larger than the clearance to the barrel wall 38 in one dimension in the melt as the screw 10 rotates, while allowing smaller particles to pass through the clearance between the barrel wall 38 and the outermost dimension of the mixer section 28. Any material trapped by mixer section 28 is eventually melted by heat conduction.

The molten plastic material being processed with the smaller solid particles distributed therein then passes through the melting zone 30 as the rotation of the screw continues. As can be seen from FIGS. 1 and 2, this section consists of two parallel profiled channels 60 and 62, each having a plurality of peaks 46 and valleys 48. Here again, the peaks and valleys are offset from each other, preferably so that the peaks 46 in one channel are adjacent to the valleys 48 in the other channel. As before, the peaks 46 and the valleys 48 are formed by alternating ascending portions 68 and descending portions 70.

The material in the zone 30 flows in a similar way as it does in the zone 26. It is completely melted as it passes from the inlet to the zone 30 to the screw discharge end 72. Since the plastic material in the zone 30 experiences a multidirectional reorientation as it flows along the zone 30 ad over the various peaks and valleys, a substantially homogeneous status is achieved when the plastic material reaches the screw discharge end 72.

The principal advantage of the screw design of the present invention is the ability to control shear during melting and to enlarge the heat transfer surface by breaking up the compacted solid bed. This is particularly an advantage for shear sensitive resins like PET that generate an undesirable acid aldehyde byproduct under shear.

Table I below is a summary of the cycle time results for trials conducted with one embodiment of the present invention compared to a conventional PET resin screw for processing PET and a PET-PEN blend. Each screw was a 25:1 screw with a 50 mm diameter. As can be seen from the reported results, with constant temperature and back pressure conditions, cycle time for processing each resin was about 20% shorter using the screw design of the present invention.

TABLE I

| Processing Conditions | Wave Screw 50 mm diameter | | Conventional PET Screw 50 mm diameter | |
| --- | --- | --- | --- | --- |
| | PET | PET-PEN | PET | PET-PEN |
| Temperature (° C.) | 280 | 290 | 280 | 295 |
| Back Pressure (%) | 60 | 90 | 60 | 90 |
| Cycle Time (sec) | 25.0 | 26.1 | 25.8 | 31.2 |

Table II below is the summary of the acid aldehyde (AA) results for trails conducted with an embodiment of the present invention compared to a conventional PET resin screw. Each screw was a 25:1 screw, had a 100 mm. diameter and was used to process PET. Under constant back pressure and cycle time constraints, the operating temperature could be lowered about 10 degrees Celsius while avoiding any unmelted agglomerations by using the screw of the present invention, thus leading to substantially lower AA levels.

TABLE II

| Processing Conditions | Wave Screw 100 mm diameter | PET Screw 100 mm diameter |
|---|---|---|
| Cycle Time (Sec) | 18.1 | 18.0 |
| Back Pressure (Psi %) | 122 | 124 |
| Temperature (° C.) | 265 | 275 |
| Average AA Level (g/l) | 1.65 | 2.29 |

As previously discussed, one of the advantages of the screw design of the present invention is that shear heat is minimized during resin melting, ensuring less degradation. Using the screw design of the present invention, immiscible resin blends, such as PET-PEN can be processed without the usual inhomogeneities.

Figure 3:
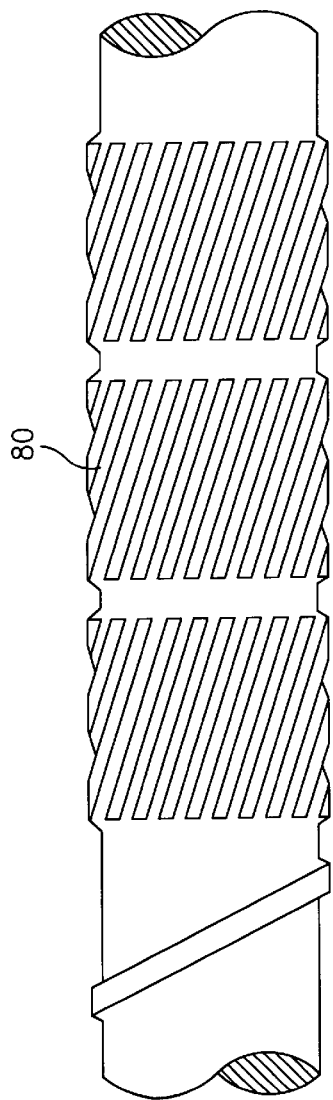
FIG. 3 is an elevational view of a Dulmage mixing section that can be substituted for the spiral mixing section illustrated in FIG. 1.
Figure 4:
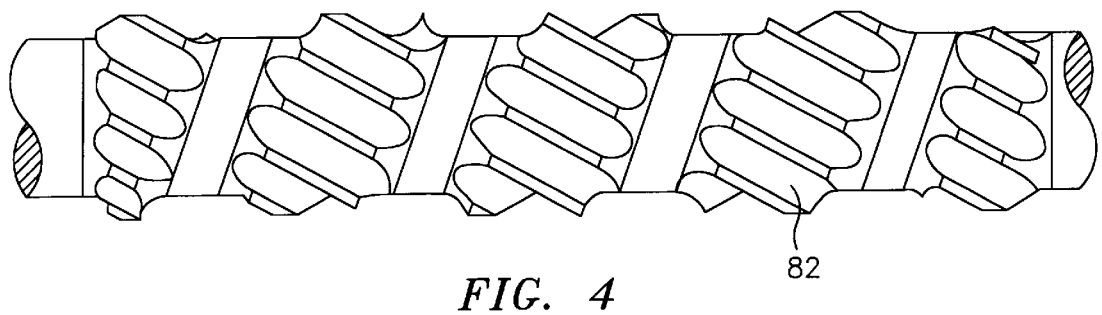
FIG. 4 is an elevational view of a Saxton mixing section that can be substituted for the spiral mixing section illustrated in FIG. 1.

Another embodiment of the invention involves a different type of mixing section. Instead of the spiral mixing section 28 in FIG. 1, a Dulmage mixing section 80 (FIG. 3) or a Saxton mixing section 82 (FIG. 4) can be used. Both types of sections cause distributive mixing by disrupting the velocity profiles in the screw channel.

It is apparent that there has been provided in accordance with this invention a double wave screw which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A screw apparatus for supplying plasticated plastic material to an injection molding machine comprising:

a screw housed within a barrel;

said screw including a feed section for receiving plastic material in solid form;

said screw further including a compression zone for receiving said plastic material in solid form from said feed section and for initiating melting of said plastic material;

said screw further including a first melting zone positioned adjacent said compression zone for receiving partially melted plastic material from said compression zone, said first melting zone having two side-by-side channels, each said channel having a first portion with a first depth and a second portion with a second depth and the first portions in a first one of said channels being offset with respect to the first portions in a second one of said channels;

said screw further including a mixing zone adjacent said first melting zone for receiving melted plastic material from said first melting zone, said mixing zone being formed by more than two channels of substantially uniform width;

each channel in said mixing zone having a depth which gradually decreases from an inlet of the mixing zone to an outlet of the mixing zone;

said screw further including a second melting zone positioned adjacent an outlet of said mixing zone, said second melting zone having two side-by-side channels, each said channel of the second melting zone having a first portion with a first depth and a second portion with a second depth and the first portions in a first one of said channels of the second melting zone being offset with respect to the first portions in a second one of said channels of the second melting zone;

said barrel including an inlet adjacent said feed section of said screw, an outlet adjacent said second melting zone for discharging plasticated plastic material, and a solid wall structure completely surrounding said screw and extending from said inlet of said barrel to said outlet of said barrel; and said channels in said mixing zone being spaced from said solid wall structure surrounding said screw by a distance which allows solid particles of a particular size to pass through to said second melting zone and so as to trap solid particles of a size greater than said particular size.

2. A screw apparatus for plasticating plastic material comprising:

a feed section for receiving plastic material in solid form;

a compression zone for receiving said plastic material in solid form from said feed section and for initiating melting of said plastic material, said compression zone being formed by a helical channel;

a first means for melting plastic material positioned adjacent said compression zone;

said first means comprising two side-by-side channels, each said channel having a plurality of first portions with a first depth and a plurality of second portions with a second depth and the first portions in a first one of said channels being offset with respect to the first portions in a second one of said channels;

a second means for melting said plastic material;

said second means comprising two side-by-side channels, each said channel forming said second means having a plurality of first portions with a first depth and a plurality of second portions with a second depth and the first portions in a first one of said channels forming said second means being offset with respect to the first portions in a second one of said channels forming said second means;

a mixer section intermediate said first and second melting means for receiving melted plastic material from said first means and for transmitting melted plastic material to said second melting means, said mixer section cooperating with a solid wall which surrounds said screw so as to allow solid particles of a particular size to pass through to said second melting means and so as to trap solid particles of a size greater than said particular size;

said solid wall completely surrounding said mixer section from an inlet of said mixer section to an outlet of said mixer section; and said mixer section having more than two channels for conveying said melted plastic material from said first means to said second melting means.

3. A screw contained in a barrel having an inlet portion and an outlet portion, said screw comprising:

a feed section for receiving plastic material in solid form;

a compression zone for receiving said plastic material in solid form from said feed section and for initiating melting if said plastic material, said compression zone being formed by a helical channel;

a first means for melting plastic material positioned adjacent an outlet of said compression zone;

said first means comprising two side-by-side channels, each said channel having a plurality of first portions with a first depth and a plurality of second portions with a second depth and the first portions in a first one of said channels being offset with respect to the first portions in a second one of said channels;

a second means for melting said plastic material;

said second means comprising two side-by-side channels, each said channel forming said second means having a plurality of first portions with a first depth and a plurality of second portions with a second depth and the first portions in a first one of said channels forming said second means being offset with respect to the first portions in a second one of said channels forming said second means;

a mixer section intermediate said first and melting means for receiving melted plastic material from said first means and for transmitting melted plastic material to said second melting means, said mixer section being completely surrounded by a solid wall portion of said barrel and cooperating with said solid wall portion so as to allow solid particles of a particular size to pass through to said second melting means and so as to trap solid particles of a size greater than said particular size; and said mixer section having more than two channels for conveying said melted plastic material from said first means to said second melting means.

4. The screw according to claim 3, further comprising each said channel in said mixer section having a substantially uniform width.

5. The screw according to claim 3, further comprising each said channel in said mixer section having a depth which gradually decreases from an inlet of the mixer section to an outlet of the mixer section.

6. A screw according to claim 3, wherein said depth of said helical channel forming said compression zone varies linearly from said inlet to said outlet.

\* \* \* \* \*

UNITED STATES PATENT AND TRADEMARK OFFICE
CERTIFICATE OF CORRECTION

PATENT NO. : 6,227,692 B1  Page 1 of 1
DATED : May 8, 2001
INVENTOR(S) : Heathe

It is certified that error appears in the above-identified patent and that said Letters Patent is hereby corrected as shown below:

Column 6,
Line 61, "if" should read -- of --

Signed and Sealed this

Twenty-sixth Day of July, 2005

JON W. DUDAS
*Director of the United States Patent and Trademark Office*